United States Patent [19]

Casino

[11] 4,359,966
[45] Nov. 23, 1982

[54] ANIMAL LITTER DEVICE

[76] Inventor: Alan A. Casino, 5331 Cahuenga Ave., North Hollywood, Calif. 91601

[21] Appl. No.: 249,334

[22] Filed: Mar. 30, 1981

[51] Int. Cl.³ .............................................. A01K 29/00
[52] U.S. Cl. ....................................................... 119/1
[58] Field of Search ........................... 119/1; 206/562; 229/2.5 EC

[56] References Cited

U.S. PATENT DOCUMENTS

| | | | |
|---|---|---|---|
| 2,285,129 | 6/1942 | Schwartzberg | 229/2.5 EC |
| 2,963,003 | 12/1960 | Oberg et al. | 119/1 |
| 3,265,281 | 8/1966 | Hohnjec | 229/2.5 EC |
| 3,360,150 | 12/1967 | Schechter | 229/2.5 EC X |
| 3,752,121 | 8/1973 | Brazzell | 119/1 |
| 3,809,013 | 5/1974 | Rigney et al. | 119/1 |

Primary Examiner—Robert Peshock
Assistant Examiner—Robert P. Swiatek
Attorney, Agent, or Firm—Roger A. Marrs

[57] ABSTRACT

An animal litter device is disclosed herein for use in combination with a litter box having a quantity of sand or other filler material. The device includes a screen having a plurality of pyramid shaped elements upwardly projecting from and integrally formed with a base. The pyramid elements are arranged in parallel rows and columns and an opening or hole is provided in the base at the corner juncture of each and every pyramid element with adjacent pyramid elements. A pair of handles are carried on opposite ends of the base and deodorant bars are carried on the handles.

1 Claim, 6 Drawing Figures

U.S. Patent   Nov. 23, 1982   4,359,966
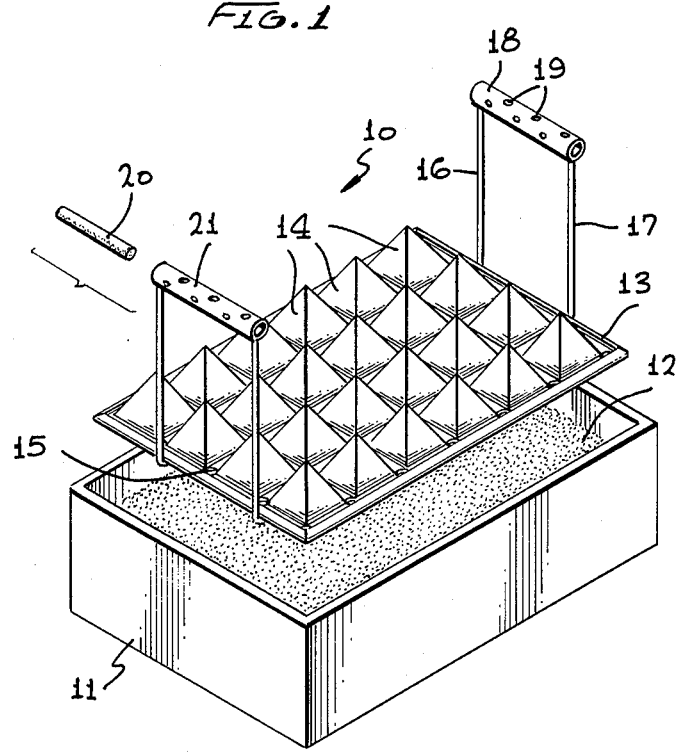
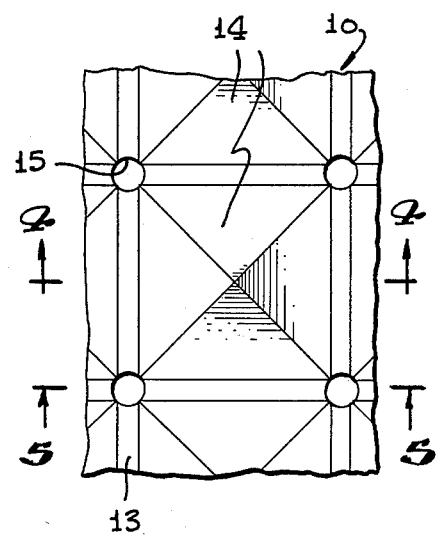
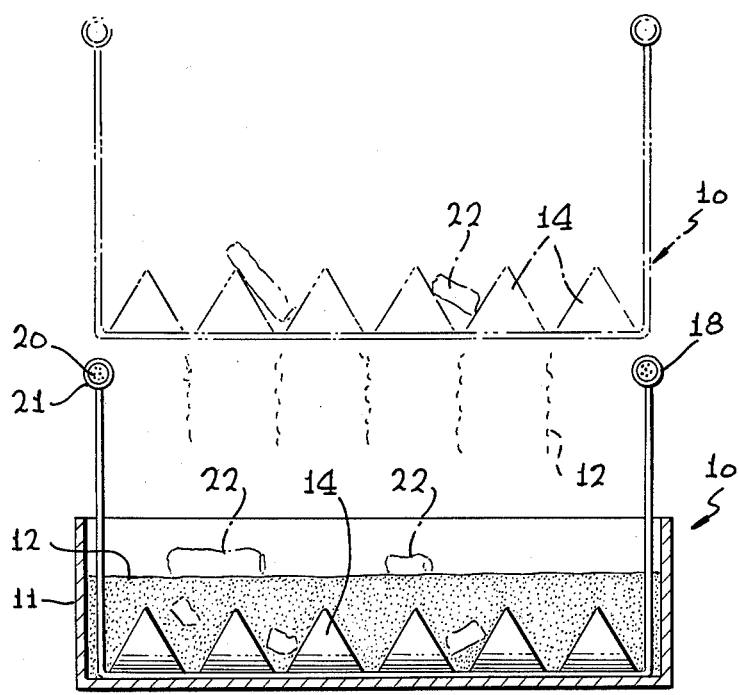
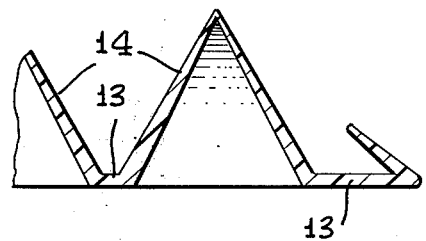
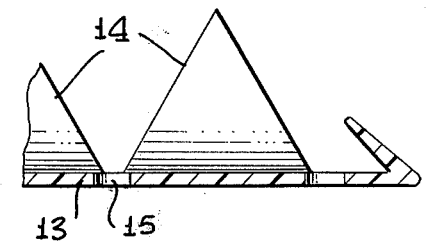

ANIMAL LITTER DEVICE

BACKGROUND OF THE INVENTION

1. Field of the Invention

The present invention relates to animal litter boxes and more particularly, to a novel box and screen combination for readily removing animal droppings and other debris without such materials having to be touched by human hands.

2. Brief Description of the Prior Art

In the past, it has been conventional practise to provide a litter box which comprises a standard container having a bottom surrounded by an upright sidewall so as to define an interior which is filled with sand or a sand-like filler composition. The box is generally located in an area about the home or dwelling which is readily accessible for an animal to use. Subsequent to use, the litter must be changed and the contents emptied. Needless to say, this is a messy and awkward job to perform and the contents and litter usually provide an unacceptable odor.

Furthermore, difficulties and problems have been encountered with conventional litter devices which stem largely from the fact that it is not readily easy for the owner of the animal to lift and carry the litter material including the droppings to a suitable place for disposal. Oftentimes, the litter material is unequally disposed within the box and in an unbalanced condition, the box may topple from the animal owner's hands and spill onto the floor. Also, it often times happens that the litter material has not become fully saturated and therefore may be used for a longer period of time providing that certain fecal matter can be immediately disposed of in such a manner that the remaining litter is undisturbed.

Therefore, a long standing need has existed to provide a novel animal litter device which will readily permit the animal owner to remove various substances and debris from the litter material without having to remove all or a substantial quantity of the litter material. Also, it would be extremely helpful to provide a device which will minimize odors and which will readily permit the animal owner to handle the litter device so that spilling is minimized.

SUMMARY OF THE INVENTION

Accordingly, the above problems and difficulties are obviated by the present invention which provides a novel animal litter device for use in combination with a litter box having a bottom and upright sidewalls which contain a quantity of sand or other litter filler material. The device includes a base having a plurality of pyramid shaped elements integrally formed therein which outwardly project from one side thereof and which are arranged in parallel rows and columns. The base is provided with an opening or aperture at the corner junction or intersection of each and every pyramid element with an adjacent pyramid element. The base is also provided with a plurality of holes or openings in each of the pyramid elements which are substantially smaller than the apertures or openings previously mentioned with respect to the intersection of the pyramid elements. A pair of handles are carried on opposite ends of the base and deodorant means are carried on the handles in a removable fashion.

Therefore, it is among the primary objects of the present invention to provide a novel animal litter device which will permit the removal of fecal matter and other debris from a quantity of litter without having to remove the litter material itself.

Another object of the present invention is to provide a novel animal litter device which includes means for deodorizing the matter deposited on the litter material in the box.

Still another object of the present invention is to provide a novel animal litter device which may be buried in a quantity of sand or litter material so that the device is not noticed by the animal or obstructs the use for which the animal uses the box.

Still a further object of the present invention is to provide a novel animal litter device which is easy to install and use by the owner of the animal for cleansing a litter box having sand or other litter material confined therein.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front perspective view showing the novel animal litter device incorporating the present invention;

FIG. 2 is a transverse cross-sectional view of the device shown in FIG. 1 illustrating how the tray or screen of pyramid elements may be employed for removing debris in the sand or litter contained in the box;

FIG. 3 is a fragmentary top plan view of the pyramid elements employed on the screen shown in FIGS. 1 and 2;

FIG. 4 is a transverse cross-sectional view of the pyramid elements as taken in the direction of arrows 4—4 of FIG. 3;

FIG. 5 is a transverse cross-sectional view of the base shown in FIG. 3 as taken in the direction of arrows 5—5 thereof; and FIG. 6 is a perspective view of a typical pyramid element employed in the invention.

DESCRIPTION OF PREFERRED EMBODIMENT

Referring now to FIG. 1, the novel litter cleansing screen or device of the present invention is indicated in the general direction of arrow 10 which is used in combination with a litter box represented in general by the numeral 11. The litter box includes a bottom which is provided with a peripheral upwardly extending sidewall so as to define a storage area between its opposing sides. The storage area is filled with a suitable sand or litter material and is indicated in general by the numeral 12. The screen 10 includes a base 13 which is formed with a plurality of pyramid elements such as element 14 and the elements are particularly arranged in parallel rows and columns. The base 13 is formed with a plurality of large openings such as opening 15 which are located at the juncture of the corners of adjacent pyramid elements. Preferably, the pyramid elements are of solid sheet material and do not contain any holes or apertures. However, it is to be understood that a close mesh screen may be employed as a construction material in which case the pyramid elements would be pervious to moisture and extremely small particles.

The opposite ends of the device include handle means which are readily attached to the extreme ends of the base 13. In one form, the handle means associated with each end of the base includes a pair of upright rods 16 and 17 which are joined at their extended ends by a cylindrical member 18 which is formed with a plurality of holes such as hole 19. The cylindrical members 18 are employed for slidably receiving a suitable deodorant material such as is represented by numeral 20 illustrated in a position preparatory for insertion into handle member 21 carried on the other end of the base 13.

Referring now in detail to FIG. 2, it can be seen that the device 10 is embedded or buried in the litter material 12 which is contained within the box 11. When the litter material has been used by an animal, fecal material 22 resides on the surface or near the surface of the litter material while water or other moist fluids will penetrate the material to the screen. Upon jiggling or rapidly moving the device 10 with respect to the covering sand or litter material, the material 22 will be broken up by the pyramid elements and will filter through the sand or litter material to a position deeper within the material so that it is suitably buried. Also, other sand or litter material which has become hardened due to the drying of fluids therein, will be broken up and further filtered downwardly within the total quantity of sand or litter material. By this means, such offensive material is deeply buried in the covering material and the covering material such as the sand or litter material may be used longer than can otherwise be used when such offensive material is located on the surface or the near surface.

When desired, the screen 10 may be raised to the position shown in broken lines and any material which has not been broken up will be carried away from the sand or litter material and may be readily discarded. The sand or litter material may be filtered through the enlarged openings 15 and, if other openings are provided in the pyramid elements, a further filtering action will also be produced.

Referring now in detail to FIG. 3, it can be seen that the pyramid elements 14 are of solid material and that the holes 15 are located at the juncture of the corners of adjacent pyramid elements.

Referring to FIG. 4, the integral construction of the pyramid elements with respect to the base 13 is shown. Also, in a preferred embodiment of the invention, the thickness of the pyramid elements is tapered from its base towards its apex. Such construction will provide lightness. However, it is to be understood that the screen or device 10 is completely rigid.

The base 13 is illustrated in FIG. 5 illustrating the provisions for apertures or holes 15 through which the bulk of the material mass will travel after it has been broken up by the jiggling action previously described.

As the bulk of the material is struck by the pyramid elements, the smaller portions of the bulk are then passed through the apertures 15 and into a lower area of the covering material.

Referring now in detail to FIG. 6, another embodiment of the present invention is illustrated wherein each of the respective pyramid elements may be provided with a plurality of holes, such as hole 23 in each of the respective sides of the pyramid such as pyramid 14. Such holes may be in addition to or exclusive of the holes 15 provided in the base 13. The size of the holes must be sufficient to pass broken up chunks or pieces of the bulk material.

Therefore, in view of the foregoing it can be seen that the novel litter device of the present invention provides a means for readily cleansing a quantity of sand or litter material from undesired materials. Odors are readily controlled by the use of deodorants 20 which may be readily carried in the handle of the device. The device is preferably of integral construction so that the pyramid elements are formed from a single sheet of material and the holes 15 are readily punched or otherwise formed in the sheet simultaneously with forming of the pyramid elements.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An animal litter device comprising the combination of:

a base;

a plurality of pointed shaped elements outwardly projecting from one side of said base;

said plurality of elements arranged in parallel rows and columns;

said base provided with a plurality of openings arranged in a pattern adjacent to said plurality of elements;

handle means disposed at opposite ends of said base;

said elements are a plurality of pyramids wherein each of said pyramids having flat sides and said pyramid flat sides are provided with several holes;

deodorant means removably carried on said handle means;

an animal litter box holding a quantity of litter or sand; and said base including said pyramid elements being buried in said litter or sand.

* * * * *